(12) United States Patent
Topham

(10) Patent No.: US 7,428,630 B2
(45) Date of Patent: Sep. 23, 2008

(54) PROCESSOR ADAPTED TO RECEIVE DIFFERENT INSTRUCTION SETS

(75) Inventor: Nigel Peter Topham, Wokingham (GB)

(73) Assignee: Altera Corporation, San Jose, CA (US)

( * ) Notice: Subject to any disclaimer, the term of this patent is extended or adjusted under 35 U.S.C. 154(b) by 193 days.

(21) Appl. No.: 11/147,689

(22) Filed: Jun. 8, 2005

(65) Prior Publication Data

US 2005/0223192 A1    Oct. 6, 2005

Related U.S. Application Data

(62) Division of application No. 09/903,208, filed on Jul. 11, 2001, now Pat. No. 7,130,989.

(30) Foreign Application Priority Data

Oct. 9, 2000    (GB) .................... 0024723.9

(51) Int. Cl.
*G06F 9/30* (2006.01)
(52) U.S. Cl. .................................... 712/209
(58) Field of Classification Search ............... 712/209
See application file for complete search history.

(56) References Cited

U.S. PATENT DOCUMENTS 6,385,757 B1 *   5/2002   Gupta et al. ................. 716/1
6,408,428 B1 *   6/2002   Schlansker et al. ......... 716/17
6,490,716 B1 *  12/2002   Gupta et al. ............... 716/18

(Continued)

FOREIGN PATENT DOCUMENTS

| EP | 0 199 173 | 10/1986 |
| EP | 0 813 144 | 12/1997 |
| EP | 1 296 225 | 3/2003 |
| GB | 2 289 353 | 11/1995 |

(Continued)

OTHER PUBLICATIONS

"OPCODE remap and Compression in Hard-wired Risc Microprocessor;" IBM Technical Disclosure Bulletin; vol. 32, No. 10A; p. 349; Mar. 1990.

(Continued)

*Primary Examiner*—Aimee J Li
(74) *Attorney, Agent, or Firm*—Greer, Burns & Crain, Ltd.

(57) ABSTRACT

A processor has respective first and second external instruction formats ($F_1$, $F_2$) in which instructions (add, load) are received by the processor. Each instruction has an opcode (e.g. 1011) which specifies an operation to be executed. Each external format has one or more preselected opcode bits ($F_1$: i+1~i+4; $F_2$: i+1~i+3) in which the opcode appears. The processor also has an internal instruction format ($G_1$) into which instructions in the external formats are translated prior to execution of the operation.

A first operation (add) is specifiable in both the first and second external formats ($F_1$, $F_2$), and a second operation (load) is specifiable in the second external format ($F_2$). The first and second operations have distinct opcodes (101, 011) in the second external format. In each of the preselected opcode bits which the first and second external formats have in common (i+1~i+3), the opcodes of the first operation (101) in the two external formats are identical.

Such "congruent" instruction encodings can enable a translation process, for translating the external-format opcode into a corresponding internal-format opcode, without the need to positively identify each individual external-format opcode.

14 Claims, 16 Drawing Sheets

U.S. PATENT DOCUMENTS 6,651,222 B2 * 11/2003 Gupta et al. .................... 716/1
6,701,515 B1 * 3/2004 Wilson et al. ............... 717/117
2003/0074654 A1 * 4/2003 Goodwin et al. ............ 717/161

OTHER PUBLICATIONS

"A Programmable Instruction Format Extension to VLIW Architectures;" De Gloria et al.; IEEE; pp. 35-40; Mar. 1992.

Kissell, MIPS16: High-Density MIPS for the Embedded Market, 1997.

MIPS Technologies, Inc., Product Description: MIPS16 Application-Specific Extension, Jan. 30, 1997, p. 1-67.

Atmel Corporation ARM7TDMI™ (Thumb®) Datasheet; Advanced RISC Machines Limited (ARM®). Revision B. Jan. 1999; pp. 28 and 78.

* cited by examiner

| Operation | Internal format | External formats (Scalar) | | External formats (VLIW) | | | |
|---|---|---|---|---|---|---|---|
| | | | | Issue slot A | | Issue slot B | |
| | | $F_4$ | $F_5$ | $F_1$ | $F_2$ | $F_2$ | $F_3$ |
| add | $G_1$ | ▨ | ▨ | ▨ | ▨ | | |
| | $G_2$ | ▨ | ▨ | | | ▨ | ▨ |
| or | $G_1$ | ▨ | ▨ | ✱ | ▨ | | |
| | $G_2$ | ▨ | ▨ | | | ▨ | ▨ |
| mul | $G_1$ | ▨ | ▨ | ▨ | ▨ | | |
| | $G_2$ | ▨ | ▨ | | | ▨ | ▨ |
| li | $G_1$ | ▨ | | | ▨ | | |
| | $G_2$ | ▨ | | | | ▨ | |
| sub | $G_1$ | | ▨ | ▨ | | | |
| | $G_2$ | | ▨ | | | | ▨ |
| rv | $G_2$ | | | | | | ▨ |
| div | $G_2$ | | ▨ | | | | ▨ |

Fig.6

| Operation | Internal formats | External formats (Scalar) | | External formats (VLIW) | | | |
|---|---|---|---|---|---|---|---|
| | | | | Issue slot A | | Issue slot B | |
| | | $F_4$ | $F_5$ | $F_1$ | $F_2$ | $F_2$ | $F_3$ |
| add | $G_1$ | 000 | 000 | 000 | 000 | | |
| | $G_2$ | 000 | 000 | | | 000 | 000 |
| or | $G_1$ | | | | | | |
| | $G_2$ | | | | | | |
| mul | $G_1$ | | | | | | |
| | $G_2$ | | | | | | |
| li | $G_1$ | | | | | | |
| | $G_2$ | | | | | | |
| sub | $G_1$ | | | | | | |
| | $G_2$ | | | | | | |
| rv | $G_2$ | | | | | | |
| div | $G_2$ | | | | | | |

| Operation | Internal formats | External formats (Scalar) | | External formats (VLIW) | | | |
|---|---|---|---|---|---|---|---|
| | | | | Issue slot A | | Issue slot B | |
| | | $F_4$ | $F_5$ | $F_1$ | $F_2$ | $F_2$ | $F_3$ |
| add | $G_1$ | 000 | 000 | 000 | 000 | | |
| | $G_2$ | 000 | 000 | | | 000 | 000 |
| or | $G_1$ | 001 | 001 | 001 | 001 | | |
| | $G_2$ | 001 | 001 | | | 001 | 001 |
| mul | $G_1$ | | | | | | |
| | $G_2$ | | | | | | |
| li | $G_1$ | | | | | | |
| | $G_2$ | | | | | | |
| sub | $G_1$ | | | | | | |
| | $G_2$ | | | | | | |
| rv | $G_2$ | | | | | | |
| div | $G_2$ | | | | | | |

| Operation | Internal formats | External formats (Scalar) | | External formats (VLIW) | | | |
|---|---|---|---|---|---|---|---|
| | | | | Issue slot A | | Issue slot B | |
| | | $F_4$ | $F_5$ | $F_1$ | $F_2$ | $F_2$ | $F_3$ |
| add | $G_1$ | 000 | 000 | 000 | 000 | | |
| | $G_2$ | 000 | 000 | | | 000 | 000 |
| or | $G_1$ | 001 | 001 | 001 | 001 | | |
| | $G_2$ | 001 | 001 | | | 001 | 001 |
| mul | $G_1$ | 010 | 010 | 010 | 010 | | |
| | $G_2$ | 010 | 010 | | | 010 | 010 |
| li | $G_1$ | | | | | | |
| | $G_2$ | | | | | | |
| sub | $G_1$ | | | | | | |
| | $G_2$ | | | | | | |
| rv | $G_2$ | | | | | | |
| div | $G_2$ | | | | | | |

| Operation | Internal formats | External formats (Scalar) | | External formats (VLIW) | | | |
|---|---|---|---|---|---|---|---|
| | | | | Issue slot A | | Issue slot B | |
| | | $F_4$ | $F_5$ | $F_1$ | $F_2$ | $F_2$ | $F_3$ |
| add | $G_1$ | 000 | 000 | 000 | 000 | | |
| | $G_2$ | 000 | 000 | | | 000 | 000 |
| or | $G_1$ | 001 | 001 | 001 | 001 | | |
| | $G_2$ | 001 | 001 | | | 001 | 001 |
| mul | $G_1$ | 010 | 010 | 010 | 010 | | |
| | $G_2$ | 010 | 010 | | | 010 | 010 |
| li | $G_1$ | 011 | | | 011 | | |
| | $G_2$ | 011 | | | | 011 | |
| sub | $G_1$ | | | | | | |
| | $G_2$ | | | | | | |
| rv | $G_2$ | | | | | | |
| div | $G_2$ | | | | | | |

| Operation | Internal formats | External formats (Scalar) | | External formats (VLIW) | | | |
|---|---|---|---|---|---|---|---|
| | | | | Issue slot A | | Issue slot B | |
| | | $F_4$ | $F_5$ | $F_1$ | $F_2$ | $F_2$ | $F_3$ |
| add | $G_1$ | 000 | 000 | 000 | 000 | | |
| | $G_2$ | 000 | 000 | | | 000 | 000 |
| or | $G_1$ | 001 | 001 | 001 | 001 | | |
| | $G_2$ | 001 | 001 | | | 001 | 001 |
| mul | $G_1$ | 010 | 010 | 010 | 010 | | |
| | $G_2$ | 010 | 010 | | | 010 | 010 |
| li | $G_1$ | 011 | | | 011 | | |
| | $G_2$ | 011 | | | | 011 | |
| sub | $G_1$ | | | | | | |
| | $G_2$ | | | | | | |
| rv | $G_2$ | | | | | | |
| div | $G_2$ | | | | | | |

| Operation | Internal formats | External formats (Scalar) | | External formats (VLIW) | | | |
|---|---|---|---|---|---|---|---|
| | | | | Issue slot A | | Issue slot B | |
| | | $F_4$ | $F_5$ | $F_1$ | $F_2$ | $F_2$ | $F_3$ |
| add | $G_1$ | 000 | 000 | 000 | 000 | | |
| | $G_2$ | 000 | 000 | | | 000 | 000 |
| or | $G_1$ | 001 | 001 | 001 | 001 | | |
| | $G_2$ | 001 | 001 | | | 001 | 001 |
| mul | $G_1$ | 010 | 010 | 010 | 010 | | |
| | $G_2$ | 010 | 010 | | | 010 | 010 |
| li | $G_1$ | 011 | | | 011 | | |
| | $G_2$ | 011 | | | | 011 | |
| sub | $G_1$ | | 100 | 100 | | | |
| | $G_2$ | | 100 | | | | 100 |
| rv | $G_2$ | | | | | | |
| div | $G_2$ | | | | | | |

| Operation | Internal formats | External formats (Scalar) | | External formats (VLIW) | | | |
|---|---|---|---|---|---|---|---|
| | | | | Issue slot A | | Issue slot B | |
| | | $F_4$ | $F_5$ | $F_1$ | $F_2$ | $F_2$ | $F_3$ |
| add | $G_1$ | 000 | 000 | 000 | 000 | | |
| | $G_2$ | 000 | 000 | | | 000 | 000 |
| or | $G_1$ | 001 | 001 | 001 | 001 | | |
| | $G_2$ | 001 | 001 | | | 001 | 001 |
| mul | $G_1$ | 010 | 010 | 010 | 010 | | |
| | $G_2$ | 010 | 010 | | | 010 | 010 |
| li | $G_1$ | 011 | | | 011 | | |
| | $G_2$ | 011 | | | | 011 | |
| sub | $G_1$ | | 100 | 100 | | | |
| | $G_2$ | | 100 | | | | 100 |
| rv | $G_2$ | | | | | | 101 |
| div | $G_2$ | | | | | | |

| Operation | Internal formats | External formats (Scalar) | | External formats (VLIW) | | | |
|---|---|---|---|---|---|---|---|
| | | | | Issue slot A | | Issue slot B | |
| | | $F_4$ | $F_5$ | $F_1$ | $F_2$ | $F_2$ | $F_3$ |
| add | $G_1$ | 000 | 000 | 000 | 000 | | |
| | $G_2$ | 000 | 000 | | | 000 | 000 |
| or | $G_1$ | 001 | 001 | 001 | 001 | | |
| | $G_2$ | 001 | 001 | | | 001 | 001 |
| mul | $G_1$ | 010 | 010 | 010 | 010 | | |
| | $G_2$ | 010 | 010 | | | 010 | 010 |
| li | $G_1$ | 011 | | | 011 | | |
| | $G_2$ | 011 | | | | 011 | |
| sub | $G_1$ | | 100 | 100 | | | |
| | $G_2$ | | 100 | | | | 100 |
| rv | $G_2$ | | | | | | 101 |
| div | $G_2$ | | 110 | | | | 110 |

| Operation | Internal formats | External formats (Scalar) | | External formats (VLIW) | | | |
|---|---|---|---|---|---|---|---|
| | | | | Issue slot A | | Issue slot B | |
| | | $F_4$ | $F_5$ | $F_1$ | $F_2$ | $F_2$ | $F_3$ |
| add | $G_1$ | 00 | 000 | 000 | 00 | | |
| | $G_2$ | 00 | 000 | | | 00 | 000 |
| or | $G_1$ | 01 | 001 | 001 | 01 | | |
| | $G_2$ | 01 | 001 | | | 01 | 001 |
| mul | $G_1$ | 10 | 010 | 010 | 10 | | |
| | $G_2$ | 10 | 010 | | | 10 | 010 |
| li | $G_1$ | 11 | | | 11 | | |
| | $G_2$ | 11 | | | | 11 | |
| sub | $G_1$ | | 100 | 100 | | | |
| | $G_2$ | | 100 | | | | 100 |
| rv | $G_2$ | | | | | | 101 |
| div | $G_2$ | | 110 | | | | 110 |

PROCESSOR ADAPTED TO RECEIVE DIFFERENT INSTRUCTION SETS

This is a divisional of application Ser. No. 09/903,208, filed Jul. 11, 2001, now U.S. Pat. No. 7,130,989.

BACKGROUND OF THE INVENTION

1. Field of the Invention

The present invention relates to instruction sets for processors. In particular, the present invention relates to processors having two or more different instruction sets. The present invention also relates to methods of automatically encoding instructions for such processors.

2. Description of the Related Art

A high-performance processor is generally required to have an instruction set which can meet two requirements: compact code (so that the amount of memory required to store the processor's program is desirably small), and a rich set of operations and operands. Such requirements are particularly important in the case of an embedded processor, i.e. a processor embedded in a system such as in a mobile communications device. In this case, high code or instruction density is of critical importance because of the limited resources of the system, for example in terms of available program memory.

However, these two requirements tend to conflict with one another and are difficult to achieve in a single unified instruction set, as compact code involves a minimal encoding for each of the most frequent operations (eliminating the less frequent operations from the instruction set) whereas a rich set of operations and operands requires an orthogonal 32-bit reduced instruction set. Consequently, in a processor having a pre-existing 32-bit instruction set it has been proposed to add a compact 16-bit instruction set which provides the most commonly-used functions and/or access to a limited subset of register operands.

FIG. 1 of the accompanying drawings shows schematically the instruction sets in such a processor. Internally, at the hardware level, the processor has a set of 32-bit instructions $IS_{INT}$. Externally, the processor has two instruction sets $IS_1$ and $IS_2$. The first instruction set $IS_1$ is made up of the same 32-bit instructions as the internal instruction set $IS_{INT}$. The second instruction set $IS_2$ is made up of 16-bit instructions and the processor contains instruction translation circuitry 200 for translating each 16-bit instruction of the external instruction set $IS_2$ into a corresponding one of the 32-bit instructions of the internal instruction set $IS_{INT}$.

An embedded processor may also be a very long instruction word (VLIW) processor capable of executing VLIW instructions. The most important additional feature of a VLIW processor is Instruction-Level Parallelism (ISP), i.e. its ability to issue two or more operations simultaneously when executing VLIW instructions.

In such a VLIW processor an instruction issuing unit has a plurality of issue slots, each connected operatively to a different execution unit. It is typical for a VLIW processor that issues two or more instructions per processing cycle to encode each instruction in a different format (or group of formats) depending on the issue slot from which the instruction will be issued. The instructions that will be issued in the same processing cycle are combined together in a VLIW packet or parcel. The position of an instruction in the VLIW parcel determines the sub-set of formats in which that instruction may be encoded. In this way, formats for instructions destined for different positions within the VLIW parcel can use identical encodings without introducing ambiguity.

In practice, empirical observation suggests that 90% or more of the instructions within a program are executed so infrequently that they make up 10% or less of the execution time. Naturally, the remaining 10% of the instructions occupy 90% of the execution time. Furthermore, it is often the case that the infrequently-executed parts of a program will not be able to make effective use of the processor's ability to issue two or more instructions simultaneously. If such parts of the program were encoded using a VLIW instruction set, a large proportion of the instructions would be "no operation" (NOP) instructions inserted in the program by the compiler simply to pad out the VLIW parcels when consecutive instructions cannot appear in the same VLIW parcel because the result of one instruction is used by the next. It follows that, for parts of a program where no effective advantage can be taken of the ability to issue instructions in parallel, or where any performance gain from that ability will have little impact anyway, it is desirable to encode the program to achieve maximum code density (i.e. using the smallest possible number of bits).

Accordingly, it is desirable to provide a VLIW processor with a compact-format instruction set, so as to combine the instruction-level parallelism of VLIW architecture with the compact code "footprint" of a tightly-encoded instruction set such as a 16-bit instruction set.

In the previously-proposed processor discussed above with reference to FIG. 1, the compact instruction set was added after the design of an original 32-bit instruction set, with the result that the translation from the 16-bit instructions into 32-bit instructions is undesirably complex and slow.

It is therefore also desirable to design the instruction-set formats and encodings in such a way that the translation from each external instruction format (e.g. at least one VLIW format, and at least one compact format) into a form that can be executed directly by hardware, can be achieved more efficiently.

SUMMARY OF THE INVENTION

A processor embodying a first aspect of the present invention has "congruent" instruction encodings. In the simplest case this means that the processor has respective first and second external instruction formats in which instructions are received by the processor. Each instruction has an opcode which specifies an operation to be executed, and each external format has one or more preselected opcode bits in which the opcode appears. The processor also has an internal instruction format into which instructions in the external formats are translated prior to execution of the operations. The operations include a first operation specifiable in both the first and second external formats, and a second operation specifiable in the second external format. The first and second operations have distinct opcodes in the second external format. In each preselected opcode bit which the first and second external formats have in common, the opcodes of the first operation in the two external formats are identical.

In a second aspect of the present invention there are provided congruent processor instruction encodings. The encodings have, in the simplest case, respective first and second external instruction formats in which the instructions are received by a processor. Each instruction has an opcode which specifies an operation to be executed, and each external format has one or more preselected opcode bits in which the opcode appears. The processor instructions in the external formats are translated into an internal instruction format prior to execution of the operations. A first operation executable by the processor is specifiable in both the first and second external formats, and a second operation executable by the processor is specifiable in the second external format. The first and second operations have distinct opcodes in the second external format. In each preselected opcode bit which the first and second external formats have in common, the opcodes of the first operation in the two external formats are identical.

Such "congruent" instruction encodings can enable a translation process, for translating the external-format opcode into a corresponding internal-format opcode, to be carried out simply and quickly without the need to positively identify each individual external-format opcode.

According to a third aspect of the present invention there is provided a method of producing congruent processor instruction encodings as set out above. The method comprises: encoding the first and second operations with distinct opcodes in the second external format; and encoding the opcodes of the first operation in the first and second external formats so that, in each preselected opcode bit which the first and second external formats have in common, the opcodes of the first operation in the two external formats are identical.

According to a fourth aspect of the present invention there is provided a method of encoding instructions for a processor having two or more external instruction formats and one or more internal instruction formats. The method comprises: a) selecting initial encoding parameters including a number of effective opcode bits in each external and internal format and a set of mapping functions. Each mapping function serves to translate an opcode specified by the opcode bits in one of the external formats to an opcode specified by the opcode bits in the, or in one of the, internal formats; (b) allocating each operation executable by the processor an opcode distinct from that allocated to each other operation in each external and internal format in which the operation is specifiable. The allocated opcodes are such that each relevant mapping function translates such an external-format opcode allocated to the operation into such an internal-format opcode allocated to the operation and such that all the internal-format opcodes allocated to the operation have the same effective opcode bits; and c) if in step (b) no opcode is available for allocation in each specifiable format for every one of the said operations, determining which of the said encoding parameters is constraining the allocation in step (b), relaxing the constraining parameter, and then repeating step (b).

According to a fifth aspect of the present invention there is provided a computer-readable recording medium storing computer program which, when executed, encodes instructions for a processor having two or more external instruction formats and one or more internal instruction formats. The program comprises a selecting code portion which selects initial encoding parameters including a number of effective opcode bits in each external and internal format and a set of mapping functions. Each mapping function serves to translate an opcode specified by the said opcode bits in one of the external formats to an opcode specified by the said opcode bits in the, or in one of the, internal formats. An allocating code portion allocates each operation executable by the processor an opcode distinct from that allocated to each other operation in each external and internal format in which the operation is specifiable. The allocated opcodes are such that each relevant mapping function translates such an external-format opcode allocated to the operation into such an internal-format opcode allocated to the operation and such that all the internal-format opcodes allocated to the operation have the same effective opcode bits. If the allocating code portion finds that no opcode is available for allocation in each specifiable format for every one of the said operations, a determining code portion determines which of the encoding parameters is constraining the allocation by the allocating code portion, relaxes the constraining parameter, and then the allocating code portion repeats its allocation operation.

BRIEF DESCRIPTION OF THE DRAWINGS

FIG. 6 presents a table illustrating which operations are specifiable in each external and internal format in the FIG. 5 specific example;

FIGS. 7(A) to 7(H) present schematic diagrams for use in explaining different stages of an automatic encoding method applied to the FIG. 5 specific example; and FIG. 8 shows the final instruction encodings achieved by the method of FIG. 7.

DETAILED DESCRIPTION OF THE PREFERRED EMBODIMENTS

Figure 2:
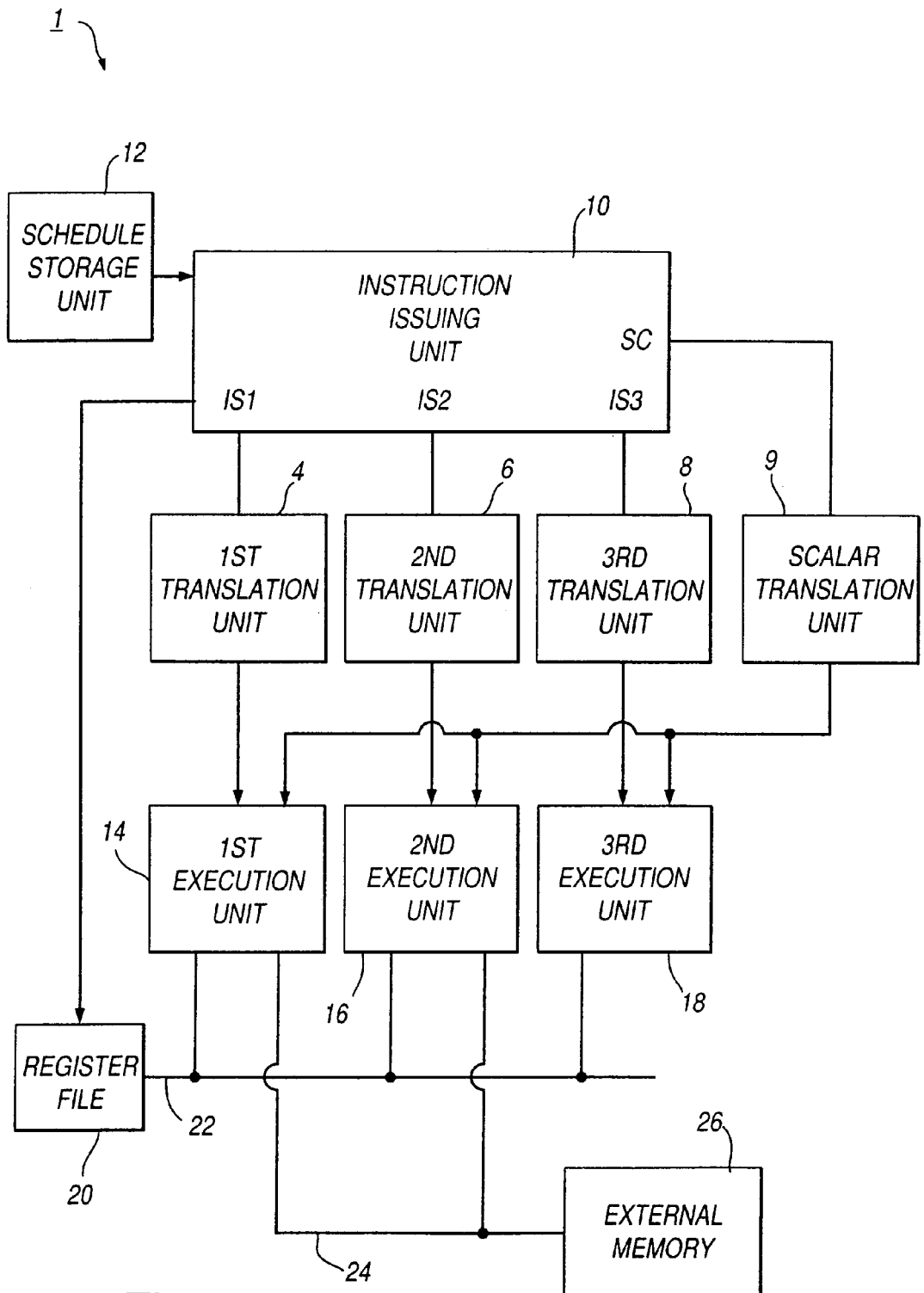
FIG. 2 shows parts of a processor embodying the present invention.

FIG. 2 shows parts of a processor embodying the present invention. In this example, the processor is a very long instruction word (VLIW) processor. The processor 1 includes an instruction issuing unit 10, a schedule storage unit 12, respective first, second and third VLIW translation units 4, 6 and 8, a scalar translation unit 9, respective first, second and third execution units 14, 16 and 18, and a register file 20.

The instruction issuing unit 10 has three issue slots IS1, IS2 and IS3 connected respectively to the first, second and third translation units 4, 6 and 8. Respective outputs of the first, second and third translation units 4, 6 and 8 are connected to respective first inputs of the first, second and third execution units 14, 16 and 18 respectively.

The instruction issuing unit 10 has a further output SC connected to the scalar translation unit 9. An output of the scalar translation unit 9 is connected in common to a second input of each execution unit 14, 16 and 18.

A first bus 22 connects all three execution unit 14, 16 and 18 to the register file 20. A second bus 24 connects the first and second units 14 and 16 (but not the third execution unit 18 in this embodiment) to a memory 26 which, in this example, is an external random access memory (RAM) device. The memory 26 could alternatively be a RAM internal to the processor 1.

Figure 1:
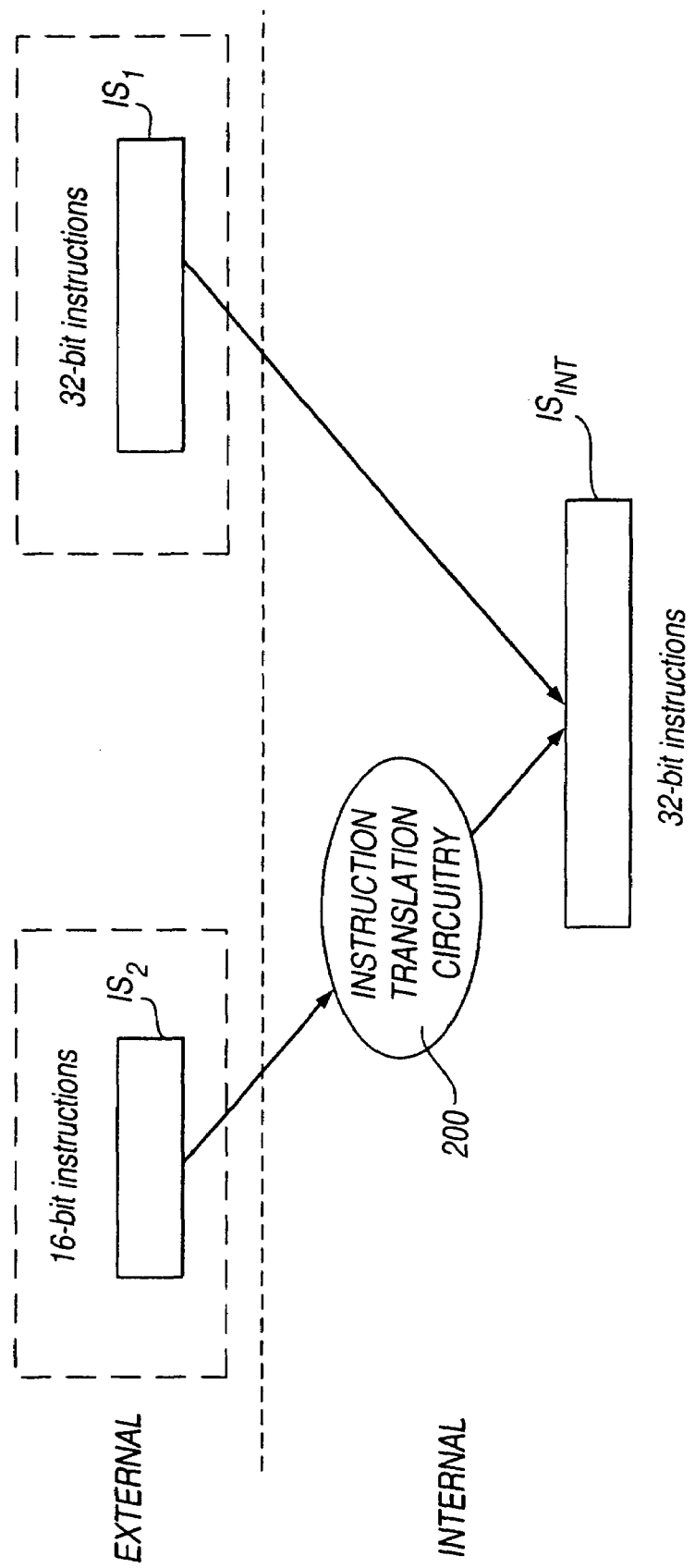
FIG. 1, discussed hereinbefore, is a schematic diagram for use in explaining a previously-proposed processor having an additional-compact instruction set.

Incidentally, although FIG. 1 shows shared buses 22 and 24 connecting the execution units to the register file 20 and memory 26, it will be appreciated that alternatively each execution unit could have its own independent connection to the register file and memory.

The processor 1 performs a series of processing cycles. The processor may operate selectively in two modes: a scalar mode and a VLIW mode.

In scalar mode the processor executes instructions from a particular instruction set (which may or may not be distinct from the VLIW instruction set). In this mode instructions are not issued at the issue slots IS1 to IS3.

In VLIW mode, on the other hand, the instruction issuing unit 10 can issue up to 3 instructions in parallel per cycle at the 3 issue slots IS1 to IS3, i.e. the full instruction issue width is exploited.

Scalar-mode instructions and VLIW-mode instructions are both stored together in the schedule storage unit 12. The instructions are issued according to an instruction schedule stored in the schedule storage unit.

As explained later in more detail, instructions in the instruction schedule are written in at least two different external formats, including at least one format belonging to a scalar instruction set of the processor (hereinafter a "scalar format") and at least one format belonging to a VLIW instruction set of the processor (hereinafter a "VLIW format"). In practice, there may be two or more scalar formats and two or more VLIW formats. In the case of the VLIW formats it is possible to have different formats for different issue slots, although a format may be shared by two or more issue slots.

On the other hand, within the processor each execution unit executes instructions in at least one internal format. Accordingly, each execution unit 14, 16 and 18 is provided with a translation unit 4, 6 or 8 which translates an instruction in one of the external VLIW formats into the (or, if more than one, the appropriate) internal format required by the execution unit concerned. Similarly, the scalar translation unit 9 is provided for translating an instruction in one of the external scalar formats into the (appropriate) internal format required by the execution units.

After translation by the relevant translation unit 4, 6, 8 or 9 the instructions issued by the instructing issuing unit 10 at the different issue slots or at the scalar instruction output SC are executed by the corresponding execution units 14, 16 and 18. Each of the execution units may be designed to execute more than one instruction at the same time, so that execution of a new instruction can be initiated prior to completion of execution of a previous instruction issued to the execution unit concerned.

To execute instructions, each execution unit 14, 16 and 18 has access to the register file 20 via the first bus 22. Values held in registers contained in the register file 20 can therefore be read and written by the execution units 14, 16 and 18. Also, the first and second execution units 14 and 16, have access via the second bus 24 to the external memory 26 so as to enable values stored in memory locations of the external memory 26 to be read and written as well. The third execution unit 18 does not have access to the external memory 26 and so can only manipulate values contained in the register file 20 in this embodiment.

As outlined above, the architecture of the FIG. 2 processor defines a compact (e.g. 16-bit) instruction set and a wider (e.g. 32-bit) VLIW instruction set. There are at least two of these wider instructions in each VLIW parcel. Instructions belonging to the compact instruction set and the VLIW instruction set are encoded using external formats.

There is also at least one internal instruction format to which all instructions in an external format are translated during execution.

Each VLIW parcel is made up of two or more instructions at different positions (slots) within the parcel. Each slot within a VLIW parcel may contain an instruction encoded in one of several external VLIW formats. At least some fundamental operations provided by the processor (e.g. add, subtract or multiply) may need to be available in two or more, or possibly all, of the instruction slots of a VLIW parcel. In this case, the same fundamental operation may be encoded in a different external format per instruction slot. Of course, when the instructions in these different external formats are translated they must all have the same operation code (opcode) within the same group of bits in the or each internal format.

A fundamental operation may also need to be available using two or more scalar instructions, for example where the same fundamental operation is performed using two or more different types of operand or operand addressing. In this case, each of the two or more scalar instructions relating to the same fundamental operation must be encoded using a different scalar format and must translate to a different internal format. Again, when translated into an internal format, these two or more scalar instructions must have the same opcode as all VLIW-format instructions for the same operation which translate to the same internal format. Typically, the scalar instruction set will be a sub-set of the full (VLIW) instruction set, allowing a more compact encoding of the external scalar formats.

Figure 3A:
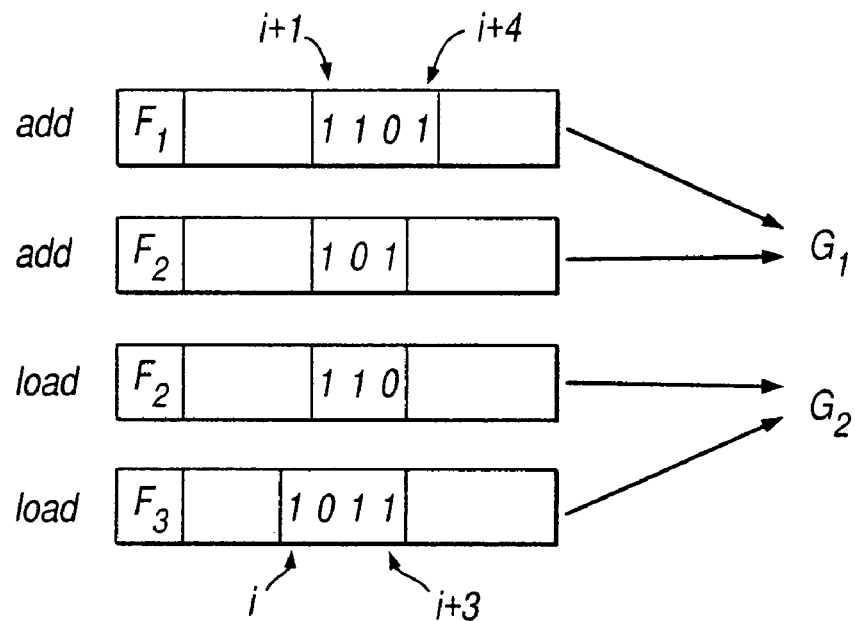
FIG. 3(A) shows a schematic diagram for use in explaining previously-considered instruction encodings.

The task of designing formats and assigning codes to each operation in each format is complicated by the fact an operation X may appear in external formats $F_1$ and $F_2$, whereas another operation Y may appear in the external format $F_2$ and in a further external format $F_3$. This means that the design of the external formats $F_1$, $F_2$ and $F_3$, and the choice of opcodes for operations X and Y, are interdependent. FIG. 3(A) shows a simple example of previously-considered instruction encodings. In this example, an add operation appears both in external formats $F_1$ and $F_2$. The add operation in both formats $F_1$ and $F_2$ is mapped to the same internal format $G_1$. A load instruction appears in the external format $F_2$ and in the further external format $F_3$. The load operation in both formats is translated into the same internal format $G_2$.

As shown in FIG. 3(A), in the different external formats $F_1$ to $F_3$, different sets of bits are used for specifying the opcode, i.e. the opcode fields are different. In the format $F_1$ the four bits from bit i+1 to bit i+4 are used to specify the opcode. In format $F_2$, the three bits from bit i+1 to bit i+3 are used to specify the opcode. In format $F_3$, the four bits from bit i to i+3 are used to specify the opcode. The opcode field for $F_2$ may be shorter than for $F_1$ and $F_3$ because there are less operations available in $F_2$, for example.

In FIG. 3(A) the external formats $F_1$ and $F_2$ have the bits i+1 to i+3 in common as opcode bits. For the add operation in format F1 and the load operation in format $F_2$ these common bits i+1 to i+3 are the same, even though the operations are different. This complicates the translation process. For example, in internal format $G_1$ the add operation may have the opcode "1011". The add operation in format $F_2$ can be translated into this internal-format-opcode simply by selecting "101" from $F_2$ and appending a "1". However, to translate the add operation in format $F_1$ into this internal-format code it is not possible to use a simple selection operation. In this case it may be necessary to examine all opcode bits i+1 to i+4 in the external format $F_1$ and match uniquely the pattern of bits ("1101") which identifies the add operation in format $F_1$. Anything short of this full examination-might not distinguish it from another operation in $F_1$.

However, if it could be guaranteed that:

(i) the opcodes for "add" and "load" in format $F_2$ are distinct, and the same is true for any other pair of operations which appear together in the same format $F_2$ as well as in at least one other format; and (ii) every operation that appears in two or more external formats (i.e. the "add" operation and any other which appears in $F_1$ and $F_2$, and the "load" operation and any other which appears in $F_2$ and $F_3$) is identically coded in all common opcode bits in all those formats in which it appears;

then the translation process can be independent of the opcodes themselves and can rely only on discovering the external format (and, if there is more than one internal format, the target internal format) of each instruction. Instruction encodings which have this property are referred to herein as "congruent" instruction encodings.

Figure 3B:
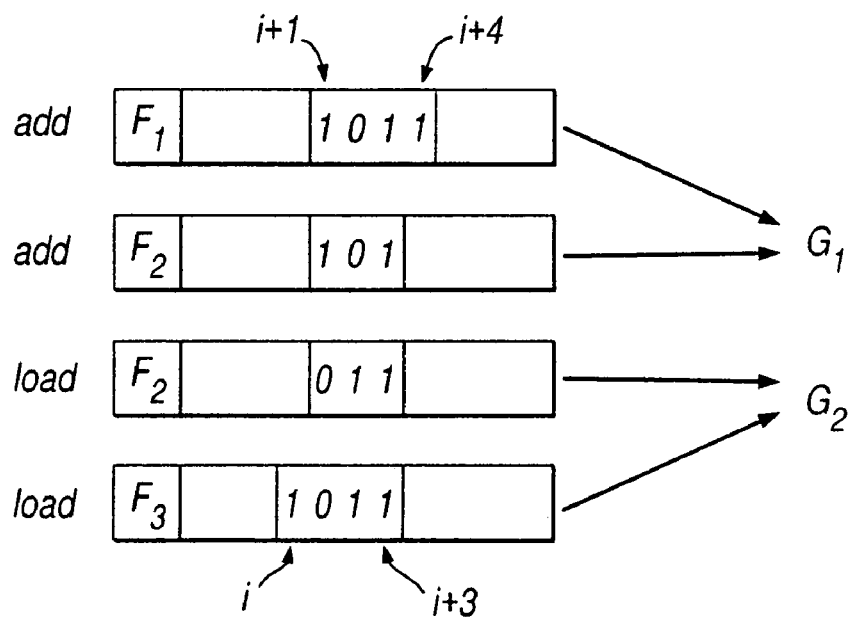
FIG. 3(B) shows a schematic diagram corresponding to FIG. 3(A) for use in explaining congruent instruction encodings.

In FIG. 3(B) the add and load operations of FIG. 3(A) have been allocated congruent instruction encodings. It can be observed that the opcodes assigned to the add instruction "1011" in format $F_1$ and "101" in format $F_2$) are identical in the three opcode bits that are in common for the two formats $F_1$ and $F_2$ ("101").

Similarly, in the case of the load operation appearing in formats $F_2$ and $F_3$, the three opcode bits that are in common for formats $F_2$ and $F_3$ are identical ("011") in $F_2$ and $F_3$.

Thus, the instruction encodings in FIG. 3 are congruent. This means that the translation operation performed by the translation unit can be a simple bit-selection operation, for example to select some or all of the bits from i+1 to i+4 in the case of translation from external format $F_1$ to internal format $G_1$, selecting some or all of the three bits from i+1 to i+3 in the case of translation from external format $F_2$ to either internal format $G_1$ or $G_2$, and selecting some or all of the four bits from i to i+3 when translating from external format $F_3$ to internal format $G_2$. The particular selection of bits required for a given translation can then be determined simply by identifying the external format and target internal format. The identification of the external format can be made by examining ID bits in the external formats, for example the bits labelled $F_1$ to $F_3$ in FIG. 3(B).

The task of designing instruction formats and opcodes having the property of congruence is not difficult in the simple case illustrated in FIG. 3(B) in which only two operations are considered. However, when there are many operations in different external formats which also appear in different internal formats the task of designing formats and assigning opcodes becomes very difficult. For example, a processor may have approximately 32 to 128 instructions in its scalar instruction set, 32 to 128 (or possibly double that) instructions in its VLIW instruction set, and perhaps 3 to 6 different external formats and 4 to 6 different internal formats.

This has meant that heretofore the translation units used to carry out the translations have been undesirably complex, leading to propagation delays and excessive power consumption in previously-considered processors.

Next, a method will be described for designing automatically formats, opcodes and translations for achieving congruent instruction encodings.

In order to describe this method for determining opcode fields within instruction formats and deriving congruent encodings in those formats let us begin by defining the terms we shall use.

$$\text{Let } W = \bigcup_{j=1}^{N} G_j$$

be the set of all internal instructions, encoded in N internal formats $G_j$.

Each internal format $G_j$ is a proper subset of W, and comprises a set of internal instructions defined by the processor that is being implemented. If y is an instruction encoded in format $G_j$, then the opcode for y is given by function $g_j(y)$ which selects a sub-field containing $a_j$ bits from the instruction format $G_j$.

Let $F_i$ denote an external instruction format, where i∈ [1, M]. If x is an instruction encoded in format $F_i$, then the code for x is given by the function $f_i(x)$ which selects a sub-field containing $b_i$ bits from the instruction $F_i$.

Each internal instruction is represented in memory by one or more external instruction formats. Where an instruction is represented in two or more external formats, each variant must translate to the same internal opcode. These variants typically perform the same function, though the types and representation of their operands may differ.

The present explanation is concerned with the process by which opcode field widths are determined, and the process by which operation codes are assigned in each format. The encoding of operands is also important, but is independent of the issue of opcode assignment and is therefore not addressed here.

A translation from external format $F_i$ to internal format $G_j$ requires a mapping function $m_{i,j}$ which maps the $b_i$ bits of opcode from $F_i$ to the $a_j$ bits of opcode in $G_j$. For the purposes of simplicity in implementation and tractability in design the mappings are preferably bit selections or permutations. In this explanation it will also be assumed that there is only one mapping function for translating between any pair of external and internal formats.

The instruction set architecture of the processor defines for each internal instruction y an associated set of translations, $T_y$, where each translation is a pair <i, j> identifying an external format as the source of the translation and an internal format as the destination of the translation. For each translation there must exist a mapping function $m_{i,j}$. Hence:

$$T_y = \{<i,j>:(y \in G_j)^\wedge(x \in F_i)^\wedge(y=m_{i,j}(x))\} \quad \text{(eq 1)}$$

Each format, whether internal or external, has a cardinality determined by the number of opcodes within the format. The cardinality of $F_i$ is written $|F_i|$, and hence the sizes of the opcode fields in external and internal formats must satisfy the following inequalities:

$$a_j \geq \log_2(|G_j|)$$

$$b_i \geq \log_2(|F_i|) \quad \text{(eq 2)}$$

Each internal format $G_j$ therefore defines opcodes in the range $|0, 2^{a_j}>$, and each external format $F_i$ defines opcodes in the range $|0, 2^{b_i}>$. At any point during the method $Q_j$ contains the set of opcodes available to be allocated to operations in internal format $G_j$. Similarly, $R_i$ contains the set of opcodes available to be allocated to operations in external format $F_i$.

Figure 4A:
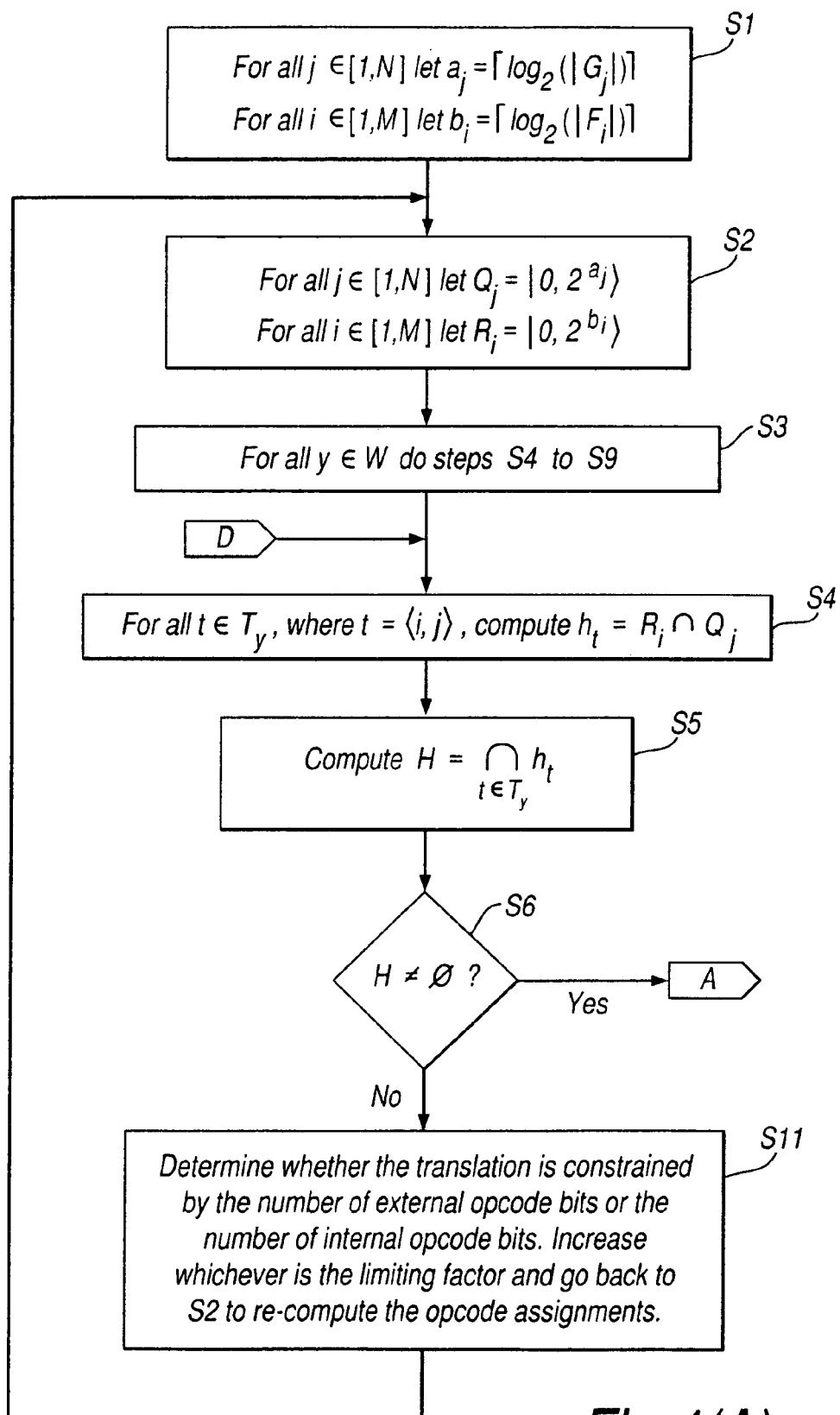
FIGS. 4(A) and 4(B) present a flowchart for use in explaining a method of encoding instructions embodying the present invention.
Figure 4B:
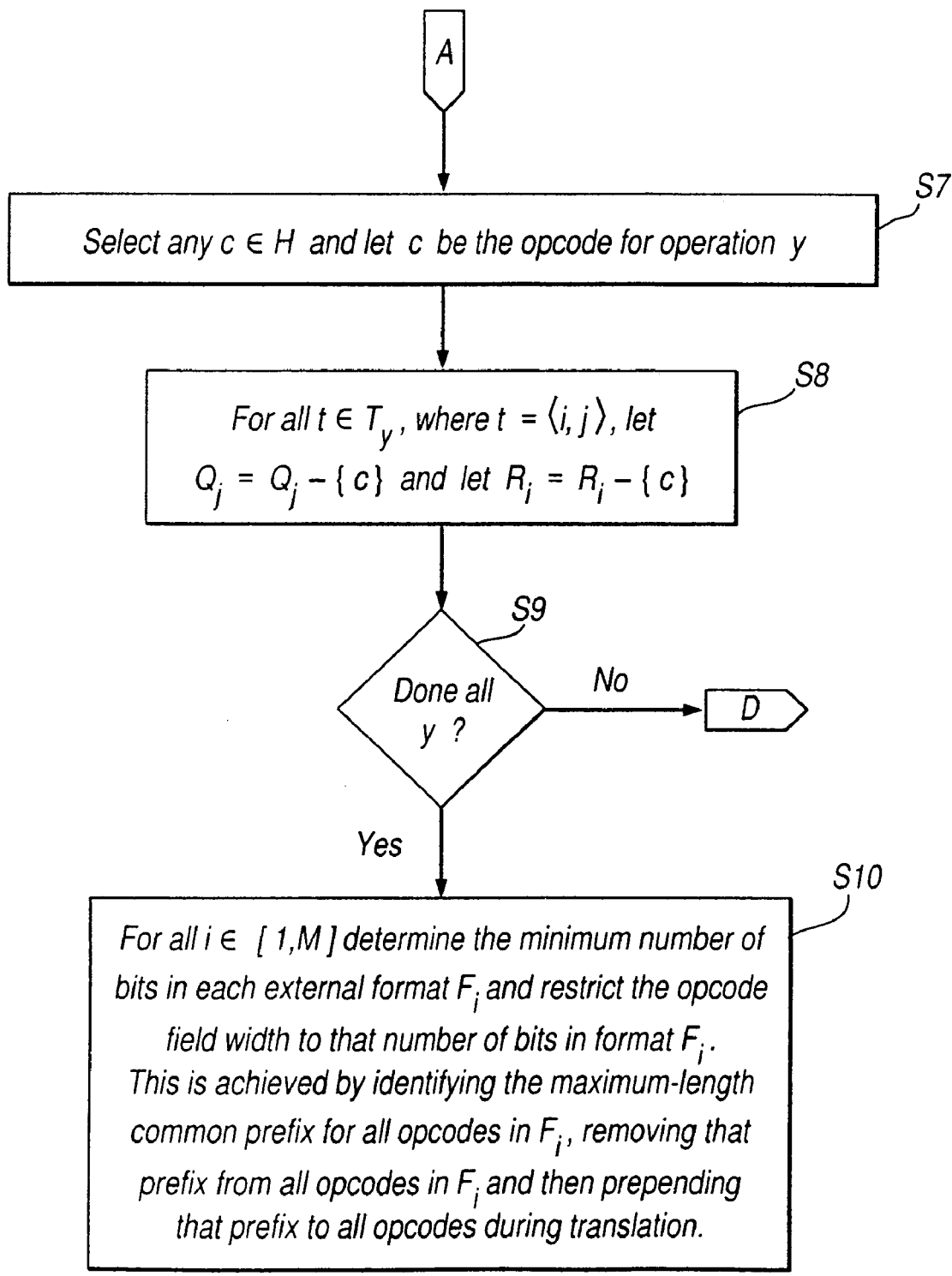

The problem now consists of determining an unique opcode for each instruction y∈N, and determining suitable selection- or permutation-based mapping functions for each translation defined in the instruction set architecture. One preferred embodiment of the method can now be expressed in pseudo-code, using the terminology introduced above, as shown in the flowchart of FIGS. 4(A) and 4(B).

Each mapping function $m_{i,j}$ initially maps a chosen number $b_i$ of effective opcode bits of the external format $F_i$ to a chosen number $a_j$ of effective opcode bits of the internal format $G_j$. This can map no more than $q = \min(a_j, b_i)$ bits from external format $F_i$ to $a_j$ bits in internal format $G_j$, setting any undefined bits in $a_j$ to zero. For simplicity, it will be assumed in this preferred embodiment that each mapping function involves selecting all bits of the external-format opcode to be some or all of the bits of the internal-format opcode after translation. Other mapping functions can be used in other embodiments of the invention, for example mapping functions involving permutations.

The method begins in step S1 by first computing the minimum possible number $a_j$ or $b_i$ of opcode bits that could theoretically encode the number of instructions in each external format and each internal format. This minimum possible number $a_j$ or $b_i$ is used as an initial number of effective opcode bits for the format concerned.

In step S2, a new series of iterations is started (as explained later, several series may be required in a practical situation). Firstly, for each internal format $G_j$, a set $Q_j$ of available opcodes is formed, made up of all possible opcodes definable by the $a_j$ bits. Similarly, for each external format $F_i$, a set $R_i$ of available opcodes is assigned, made up of all possible opcodes definable by the $b_i$ bits. As explained later, each available opcode may have a working number of bits greater than the computed minimum possible number $a_j$ or $b_i$ of opcode bits. For example, the working number for all available opcodes in all sets $Q_j$ and $R_i$ may be set equal to the highest computed minimum possible number $a_j$ or $b_i$.

Step S3 involves iterating through all operations in the internal formats and determining their opcodes in each external format where they occur.

During each series of iterations, steps S4 to S9 are performed per iteration. One fundamental operation is considered per iteration. In step S4, for the considered operation, the method examines the pair of sets $R_i$ and $Q_j$ for the external format and internal format of each mapping function needed to translate the considered operation, and identifies as a mutual set $h_t$ any members the two sets of the pair have in common. In step S5 a set H of common members of all the mutual sets $h_t$ for all the needed mapping functions is formed. If the result is an empty set in step S6, then no allowable mapping is found and the method goes to step S11 where the constraints are relaxed. If H contains at least one common opcode, step S7 selects the or one of the common opcodes in H.

Then in step S8 the selected opcode is removed from each set $R_i$ and $Q_j$ for the external and internal formats in which the considered operation appears, i.e. the sets examined in step S4.

The method terminates when it is determined in step S9 that the method has successfully allocated opcodes to all operations in all the required external and internal formats.

The method is guaranteed to terminate because the backtracking process in step S11 successively relaxes the encoding constraints until there are as many opcode bits as are needed to find a congruent assignment of codes.

In addition to selecting bits from the external format $F_i$, the mapping function may also permute the bits. For example, the order of the bits may be reversed by the mapping function. Such permutations can be used when the number of mapped bits reaches q, where $q=\min(a_j, b_i)$.

If $p=\max(a_j, b_i)$, then the total number of possible permutations is $p!/(p-q)!$. Hence, for large instruction sets, the number of possible permutations could be very large. In practice, however, it is typical for p to be about 5 and q to be about 3. This means a maximum of 60 different permutation functions for each mapping. Typically one might expect there to be five different mappings, leading to a total of $60^5$ possible sets of mapping functions to consider on each iteration of the method defined by steps S4 to S9 (i.e. 778 million possibilities). This is within the capabilities of a modern computer to enumerate and evaluate automatically.

For larger field widths the number of possible permutations grows intractably large. However, it is still possible to operate the method successfully in this case by restricting the class of permutations that will be searched. For example, there are $n(n+1)/2$ possible permutations of n-bit field defined by swapping arbitrary pairs of bits. By choosing such a restriction on the possible permutations to be examined by the method the running time of the method could be constrained to be polynomial in n.

Next, operation of the method described with reference to FIGS. 4(A) and 4(B) will be illustrated with reference to a specific example. In this example, a VLIW processor, for example a processor generally in accordance with FIG. 2, has the capability to issue two instructions simultaneously from issue slots A and B respectively.

Figure 5:
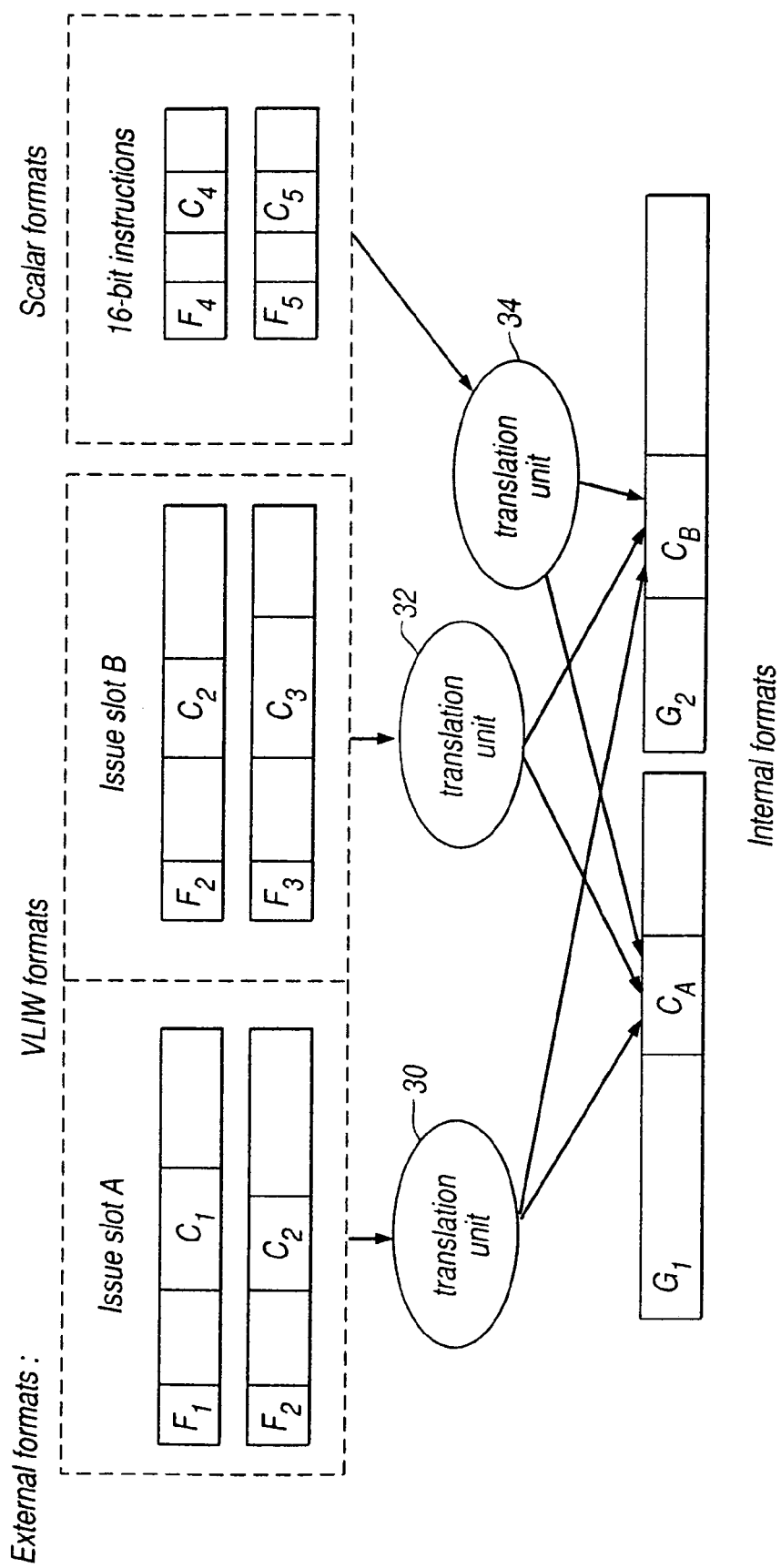
FIG. 5 shows a schematic view of external and internal instruction formats in a specific example.

Referring to FIG. 5, it can be seen that the external VLIW formats allowed for instructions to be issued from issue slot A include first and second external VLIW formats $F_1$ and $F_2$. The opcode bits in external format $F_1$ are denoted by $C_1$ in FIG. 5, and the opcode bits in format $F_2$ are denoted by $C_2$.

In the case of instructions to be issued from issue slot B, two external VLIW formats are also available, one of them is the same external format $F_2$ as available at issue slot A, and the other is a third external VLIW format $F_3$. The opcode bits in format $F_3$ are denoted by $C_3$ in FIG. 5.

In addition, the processor in this example is capable of operating in a scalar mode to execute instructions in one of two different 16-bit scalar external formats $F_4$ and $F_5$. The opcode bits in format $F_4$ are denoted by $C_4$ in FIG. 5, and the opcode bits in format $F_5$ are denoted by $C_5$.

The processor in this example also has two internal formats $G_1$ and $G_2$. The opcode bits in the internal format $G_1$ are denoted by $C_A$ in FIG. 5, and the opcode bits in internal format $G_2$ are denoted by $C_B$. Each scalar instruction translates into a single operation in one or both of the internal formats $G_1$ and $G_2$, encoded in either the $C_A$ or $C_B$ field.

As also shown schematically in FIG. 5, the processor has three translation units, 30, 32 and 34. The translation unit 30 corresponds to issue slot A and is operable to translate opcode bits $C_1$ in external format $F_1$ or opcode bits $C_2$ in external format $F_2$ into either opcode bits $C_A$ in internal format $G_1$ or opcode bits $C_B$ in internal format $G_2$.

Similarly, the translation unit 32 corresponds to issue slot B and is operable to translate opcode bits $C_2$ in external format $F_2$ or opcode bits $C_3$ in external format $F_3$ into opcode bits $C_A$ in internal format $G_1$ or opcode bits $C_B$ in internal format $G_2$.

The translation unit 34 corresponds to the scalar instructions and is operable to translate either opcode bits $C_4$ in external format $F_4$ or opcode bits $C_5$ in external format $F_5$ into opcode bits $C_A$ in internal format $G_1$ or opcode bits $C_B$ in internal format $G_2$.

It will be appreciated that the translation units 30 and 32 in FIG. 5 correspond to the translation units 4, 6 and 8 in FIG. 2, and that the translation unit 34 in FIG. 5 corresponds to the translation unit 9 in FIG. 2.

Referring now to FIG. 6, the processor in the present example has a small set of seven fundamental operations: an addition operation add, a logical OR operation or, a multiply operation mul, a load immediate operation li, a subtraction operation sub, a return from VLIW-mode operation rv and a division operation div. The table presented in FIG. 6 lists these seven fundamental operations in the first (left-hand) column. The second column in FIG. 6 indicates in which internal formats the operation concerned is permitted to appear. The add, or, mul, li and sub instructions are permitted to appear in both internal formats $G_1$ and $G_2$ and so have "G1" and "G2" rows, but the rv and div instructions are only permitted to appear in internal format $G_2$ and so have no "G1" row.

The remaining six columns in FIG. 6 relate to the five external instruction formats $F_1$ to $F_5$. The external format $F_2$ has two columns allocated to it in this case, as this format is allowed at both issue slot A and issue slot B.

Each cell in one of the six external-format columns corresponds to an instruction. Some of the cells are shaded whilst others are blank. An instruction I in a cell at row $G_j$ and $F_i$ must be represented in external format $F_i$ and must be translated to internal format $G_j$ if its cell is shaded. If the cell is not shaded then the instruction I concerned is not present in external format $F_i$. Take, for example, the cell denoted by an asterisk in FIG. 6. This cell is at row $G_1$ for the or instruction, and at column $F_1$. The shading of the cell indicates that the or instruction is present in external format $F_1$ and internal format $G_1$, requiring that opcodes for the or operation are appropriately chosen in both formats and that a translation exists for the or instruction between these two formats.

The algorithm described previously with reference to FIGS. 4(A) and 4(B) will now be applied to the present example of FIGS. 5 and 6 to determine the opcodes, the opcode field widths in each format, and the mapping functions (translations) between formats.

The set W of fundamental operations in this example can be written as:

$$W = \{add, or, mul, li, sub, rv, div\} \qquad (eq\ 3)$$

The number N of internal formats is 2 ($G_1$ and $G_2$), and the number M of external formats is 5 ($F_1$ to $F_5$).

Looking at FIG. 6, for each external format $F_i$ a mapping function $m_{i,j}$ is required if, for any operation, there is a shaded cell in row $G_j$. For example, taking the external format $F_1$, it can be seen that a mapping function is required for internal format $G_1$ but not for internal format $G_2$, as no cell in the $F_1$ column is shaded in a $G_2$ row.

Thus, the following mapping functions are required in the present example: $m_{1,1}, m_{2,1}, m_{2,2}, m_{3,2}, m_{4,1}, m_{4,2}, m_{5,1}$, and $m_{5,2}$.

The translation pairs t for each operation, which are derived directly from FIG. 6, are as follows:

$$\begin{bmatrix} T_{add} = \{\langle 1,1 \rangle, \langle 2,1 \rangle, \langle 2,2 \rangle, \langle 3,2 \rangle, \langle 4,1 \rangle, \langle 4,2 \rangle, \langle 5,1 \rangle, \langle 5,2 \rangle\} \\ T_{or} = \{\langle 1,1 \rangle, \langle 2,1 \rangle, \langle 2,2 \rangle, \langle 3,2 \rangle, \langle 4,1 \rangle, \langle 4,2 \rangle, \langle 5,1 \rangle, \langle 5,2 \rangle\} \\ T_{mul} = \{\langle 1,1 \rangle, \langle 2,1 \rangle, \langle 2,2 \rangle, \langle 3,2 \rangle, \langle 4,1 \rangle, \langle 4,2 \rangle, \langle 5,1 \rangle, \langle 5,2 \rangle\} \\ T_{li} = \{\langle 2,1 \rangle, \langle 2,2 \rangle, \langle 3,2 \rangle, \langle 4,1 \rangle, \langle 4,2 \rangle\} \\ T_{sub} = \{\langle 1,1 \rangle, \langle 3,2 \rangle, \langle 5,1 \rangle, \langle 5,2 \rangle\} \\ T_{rv} = \{\langle 3,2 \rangle\} \\ T_{div} = \{\langle 3,2 \rangle, \langle 5,2 \rangle\} \end{bmatrix} \qquad (eq\ 4)$$

In step S1 of the algorithm (FIG. 4(A)) the number of opcodes required in each format is determined. For each external format this is determined by observing the number of operations for which there is at least one shaded cell in the column for that external format. For example, in the case of the external format $F_1$ it can be seen that four operations (add, or, mul and sub) have a shaded cell in the column concerned. Where an external format has two columns (such as the external format $F_2$) an operation is only counted once even if it appears in one internal format in one column and internal format in another column. Thus, in the case of the external format $F_2$, the number of operations $|F_2|$ is 4.

In the case of an internal format the number of opcodes required is calculated by counting the total number of rows (containing at least one shaded cell) allocated to the internal format concerned. For example, the internal format $G_1$ has five rows with shaded cells. The internal format $G_2$ has seven rows with shaded cells.

Thus, the numbers of opcodes required in the different internal and external formats are: $|G_1|=5$, $|G_2|=7$, $|F_1|=4$, $|F_2|=4$, $|F_3|=6$, $|F_4|=4$ and $|F_5|=5$.

As a result, in step Si, the initial numbers of effective opcode bits are determined as $a_1=3$, $a_2=3$, $b_1=2$, $b_2=2$, $b_3=3$, $b_4=2$ and $b_5=3$. These numbers represent the minimum possible numbers of bits that could theoretically encode the number of operations appearing in the format concerned, and may have to be increased in the course of execution of the algorithm.

In step S2, a set of available opcodes is created for each external format and for each internal format, as shown in equation 5.

$$R_1 = \{000, 001, 010, 011\}$$

$$R_2 = \{000, 001, 010, 011\}$$

$$R_3 = \{000, 001, 010, 011, 100, 101, 110, 111\}$$

$$R_4 = \{000, 001, 010, 011\}$$

$$R_5 = \{000, 001, 010, 011, 100, 101, 110, 111\}$$

$$Q_1 = \{000, 001, 010, 011, 100, 101, 110, 111\}$$

$$Q_2 = \{000, 001, 010, 011, 100, 101, 110, 111\} \qquad (eq\ 5)$$

The working number of bits in each opcode is initially set to be equal to the highest required number of opcode bits amongst any of the internal and external formats, i.e. 3 opcode bits as required by the formats $G_1$, $G_2$ and $F_5$. The initial, set $R_1$ of opcodes for external format $F_1$ is made up of four three-bit codes 000, 001, 010 and 011. Four codes are required as $b_1$, was calculated to be 2 in step S1. The same is true for the other two-bit external formats $R_2$ and $R_4$.

In the case of the external formats $F_3$ and $F_5$ eight codes are required and the initial codes assigned to $R_3$ and $R_5$ are 000, 001, 010, 011, 100, 101, 110 and 111.

Each of the internal formats $G_1$ and $G_2$ also requires eight codes ($a_1=3$ and $a_2=3$) so the initial sets $Q_1$ and $Q_2$ of opcodes for these internal formats are also the same as for the external formats $R_3$ and $R_5$.

In step S3 a first series of iterations is commenced, and in this first series the first operation in FIG. 6, i.e. the add operation, is selected for initial consideration.

In step S4, the available opcodes for the operation that are unused (not yet allocated) in each relevant pair of external and internal formats (8 pairs in all: $F_1$-$G_1$, $F_2$-$G_1$, $F_4$-$G_1$, $F_5$-$G_1$, $F_2$-$G_2$, $F_3$-$G_2$, $F_4$-$G_2$, $F_5$-$G_2$, in this case) are considered. Because no opcodes have yet been allocated, for the 5 pairs $F_1$-$G_1$, $F_2$-$G_1$, $F_4$-$G_1$, $F_2$-$G_2$ and $F_4$-$G_2$ $h_t$={000, 001, 010, 011} while for the 3 pairs $F_5$-$G_1$, $F_3$-$G_2$ and $F_5$-$G_2$ $h_t$={000, 001, 010, 011, 100, 101, 110, 111}. Thus, in step S5 H={000, 001, 010, 011}.

In step S6 it is checked whether H is empty. In this case it is not, so processing proceeds to step S7. Here, the opcode c=000 is selected first from H. The opcode. 000 therefore becomes allocated to the add operation.

In step S8 the internal-format opcode sets $Q_1$ and $Q_2$ are updated to remove therefrom the opcode 000, if contained therein. Thus, the code 000 is removed from each of the sets $Q_1$ and $Q_2$.

Also in step S8 the set of available-opcodes for each relevant external format (in this case all of the external formats $F_1$ to $F_5$) is updated to remove therefrom the opcode 000, if contained therein. Thus, 000 is removed from each of the sets $R_1$ to $R_5$.

Figure 7A:
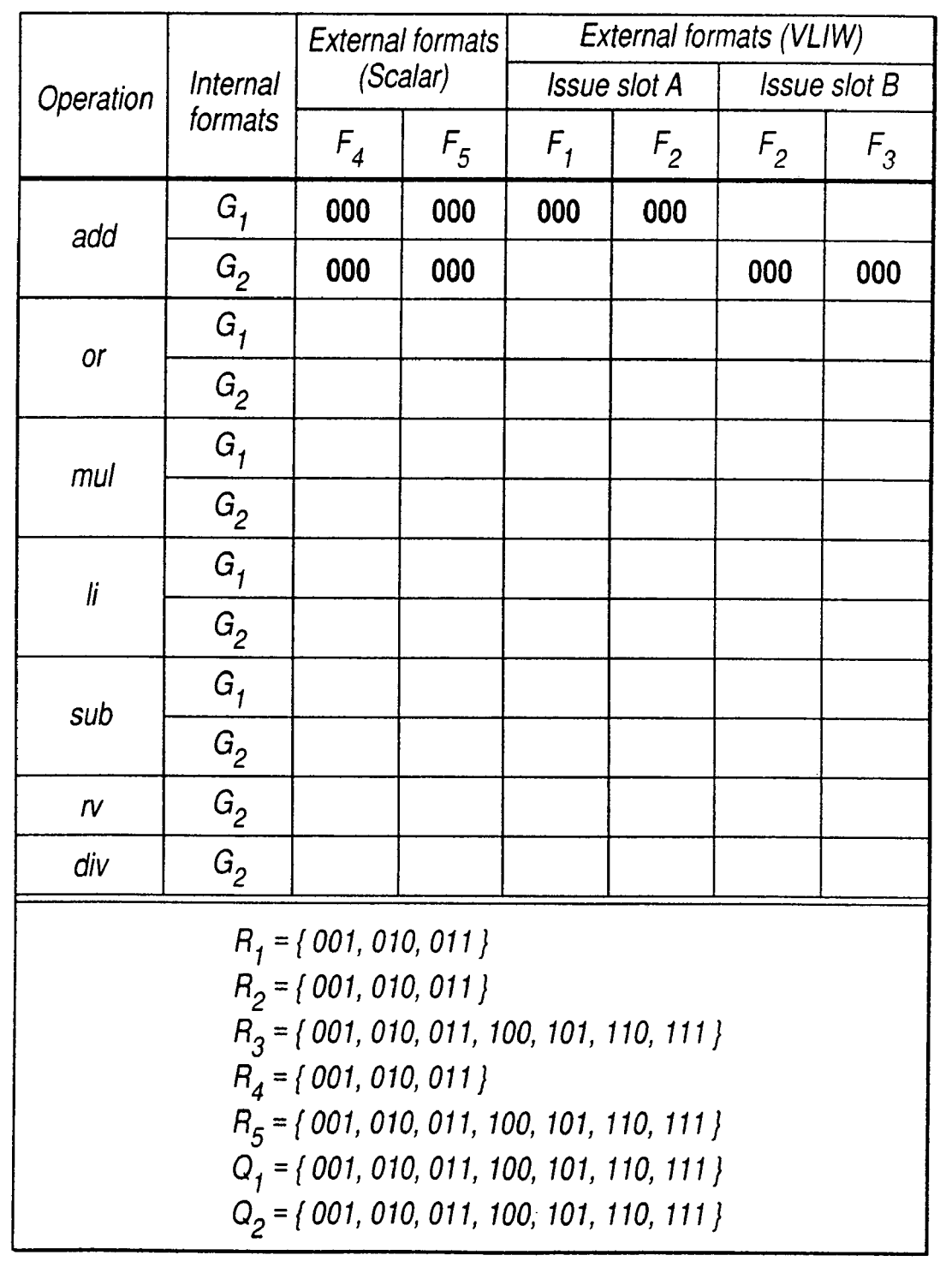

The results of the allocations performed in the first iteration are shown in FIG. 7(A). In FIGS. 7(A) to 7(H) the opcodes remaining in the sets Q or R are shown. Also, any opcode allocations made in the external and internal formats are entered in the relevant cells.

Figure 7B:
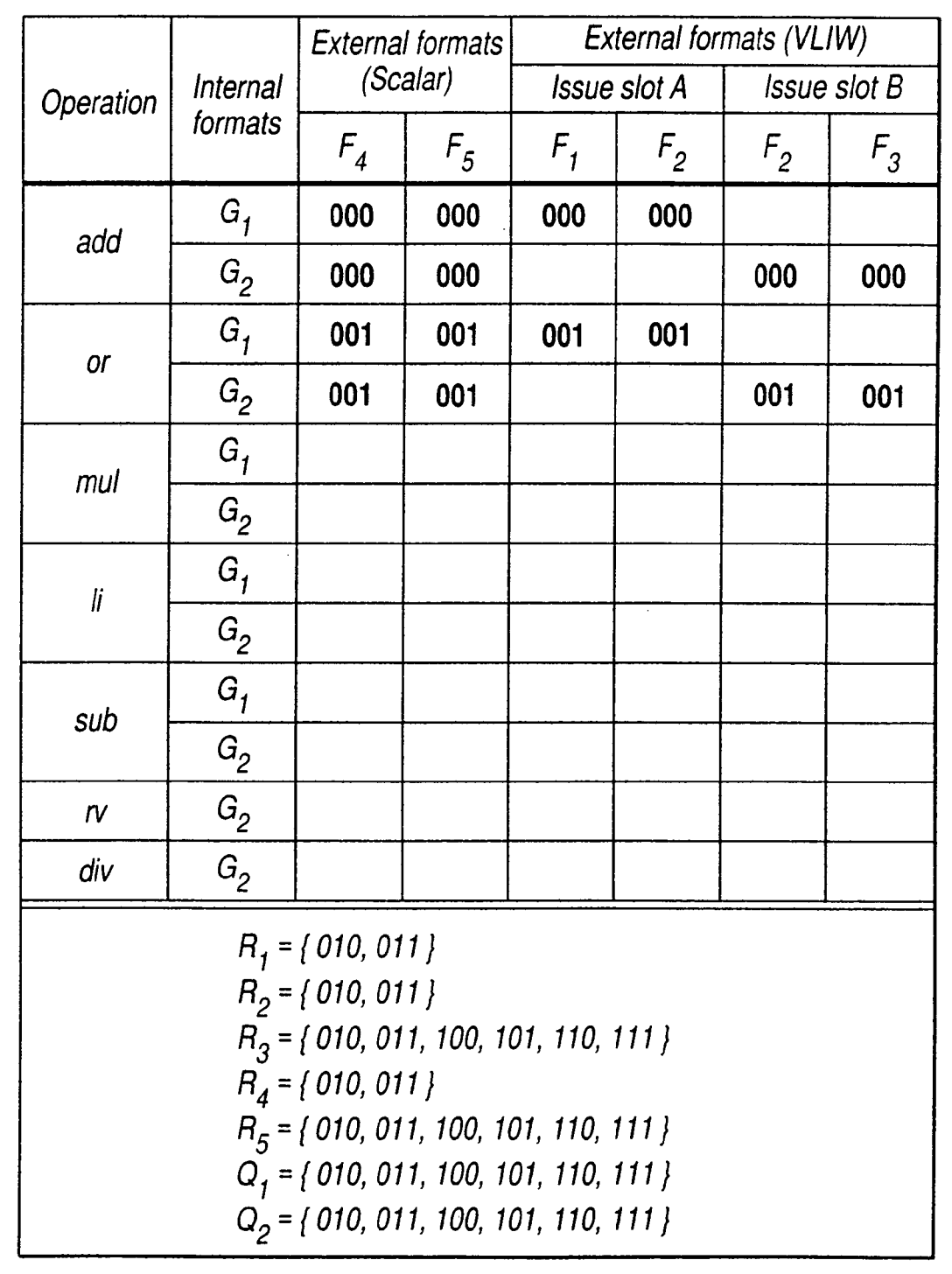

Processing then returns to step S3 for the second iteration of this series. In the second iteration, the or operation is considered. The pairs to be considered in step S4 are the same as for the first iteration. The results of steps S4 and S5 are that H={001, 010, 011}. Thus, in step S6, H is not empty and processing proceeds to step S7. In step S7 the opcode c=001 is selected. Accordingly, in step S8, the opcode 001 is removed from each of the sets $Q_1$ and $Q_2$ of available opcodes for the internal formats $G_1$ and $G_2$. Similarly, in the sets $R_1$ to $R_5$ for the external formats $F_1$ to $F_5$, the code 001 is removed. The results after the second iteration are shown in FIG. 7(B).

In the third iteration, the mul operation is considered. Again, the pairs to be considered in step S4 are the same as for the first and second iterations. In this case, the result H of the computation performed in step S5 is {010, 011}, so that, in step S7, the opcode 010 is selected. In step S8 the opcode 010 is removed from all the sets $Q_1$ to $Q_2$ and $R_1$ to $R_5$.

Thus, 010 becomes allocated to the mul operation. FIG. 7(C) shows the state reached at this time.

In the fourth iteration of the series the li instruction is considered. In this case the pairs to be examined in step S4 are $F_2$-$G_1$, $F_4$-$G_1$, $F_2$-$G_2$ and $F_4$-$G_2$. In step S5 of this iteration it is determined that H={011}. As the H set is not empty, processing goes on to step S7. Here, the code 001 is selected (it is the only code available in the set H). The code 011 therefore becomes assigned to li. This code is removed from the relevant sets $Q_1$, $Q_2$, $R_2$ and $R_4$, but is left in the sets $R_1$, $R_3$ and $R_5$. The resulting state is shown in FIG. 7(D).

In the fifth iteration, the sub instruction is considered. In step S4 the set of translations $T_{sub}$={<1,1>, <3,2>, <5,1>, <5,2>}. Accordingly, as the pairs of external and internal formats for these translations are $F_1$-$G_1$, $F_5$-$G_1$, $F_3$-$G_2$, $F_5$-$G_2$ the common sets $h_t$ are { } for $F_1$-$G_1$ and {100, 101, 110, 111} for $F_5$-$G_1$, $F_3$-$G_2$ and $F_5$-$G_2$.

This means H={Ø} in step S5. This is because, although 100, 101, 101, 110 and 111 are still unused in $R_3$, $R_5$, $Q_1$ and $Q_2$, none of these codes is available in the remaining relevant set $R_1$ which only contains 011. Accordingly, processing proceeds via step S6 to step S11 in which the constraint is assessed. It is determined that the intersection between. $R_1$ and $Q_1$ (and between $R_1$ and $Q_2$) is, the empty set. Since $R_1$ has less members than $Q_1$ and $Q_2$ it can reasonably be concluded that $R_1$ is the constraining factor. To overcome this constraint the number of effective opcode bits for $F_1$ needs to be increased beyond its initial value of 2. Accordingly, $a_1$ is increased by one to 3. The remaining values $a_2$ to $a_5$, $b_1$ and $b_2$ are left unchanged.

Figure 7E:
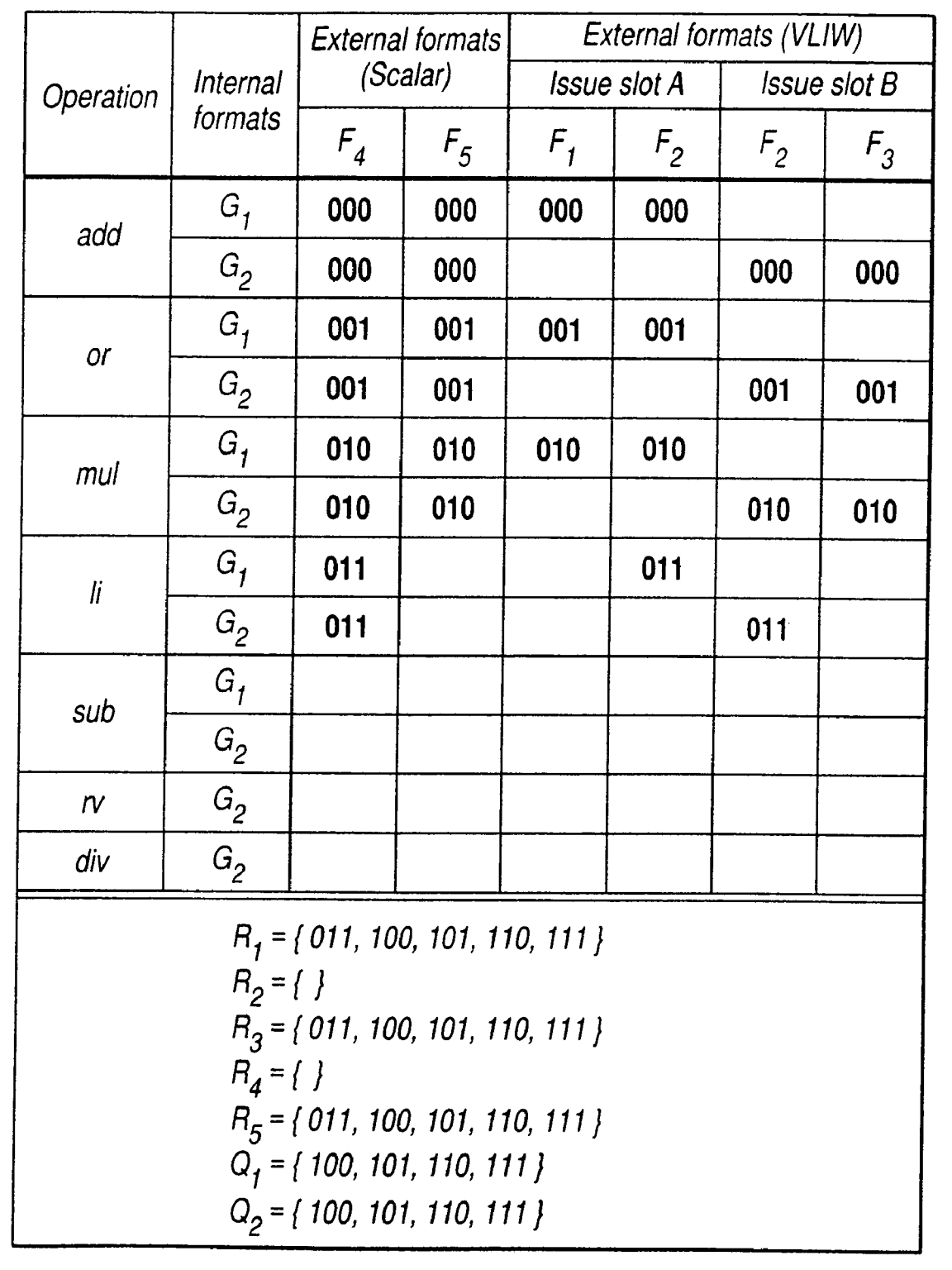

Now, all of the existing opcode assignments are void and a second series of iterations is commenced at step S2. In this series of iterations $R_1$={000, 001. 010, 011, 100, 101, 110, 111} initially. In the fifth iteration of this second series the sub instruction is again considered. At this stage the sate is shown in FIG. 7(E)

This time, in step S5 H={100, 101, 110, 111}. In step S7 the opcode 100 is selected. In step S8, 100 is removed from $R_1$, $R_3$, $R_5$, $Q_1$ and $Q_2$. The resulting state is shown in FIG. 7(F).

In the sixth iteration of the second series, the rv instruction is considered for the first time. In step S5 H={101, 110, 111}. In step S7 the opcode 101 is selected. In step S8, 101 is removed from $R_3$ and $Q_2$. The resulting state is shown in FIG. 7(G).

In the seventh iteration of the second series, the div instruction is considered for the first time. In step S5 H={110, 111}. In step S7 the opcode 110 is selected. In step S8, 100 is removed from $R_3$, $R_5$ and $Q_2$, The resulting state is shown in FIG. 7(H).

At this point all instructions have been allocated opcodes and the processing moves to step S10. In this step the opcodes assigned so far are examined to determine how many bits in each external format actually need to be provided in the instructions in the external format concerned. For example, in the external format $F_4$ all the allocated codes 000, 001, 010 and 011 have the prefix 0. This means that the prefix 0 is entirely redundant is external format $F_4$. Accordingly, provided that the format $F_4$ can still, be distinguished from all other external formats, the prefix 0 can be omitted from instructions in format $F_4$ so that only a 2-bit opcode field is required for format $F_4$. The same is true for external format $F_2$.

It follows of course that the mapping functions $m_{4,1}$, $m_{4,2}$, $m_{2,1}$ and $m_{2,2}$ must insert the 0 prefix during translation so that the add, or mul and li operations in format $F_4$ are distinguished from the sub, rv and div operations in formats $F_1$, $F_3$ and $F_5$.

This optimisation step S10 becomes particularly important when the number of prefix bits is greater than the number of bits in each instruction set needed to give each operation a distinct opcode in each external format.

The final opcodes after optimisation are shown in FIG. 8.

A method embodying the present invention can be implemented by a general-purpose computer operating in accordance with a computer program. This computer program may be carried by an suitable carrier medium such as a storage medium (e.g. floppy disk or CD Rom) or a signal. Such a carrier signal could be a signal downloaded via a communications network such as the Internet. The appended computer program claims are to be interpreted as covering a computer program by itself or in any of the above-mentioned forms.

Although the above description relates, by way of example, to a VLIW processor it will be appreciated that the present invention is applicable to processors other than VLIW processors. A processor embodying eh present invention may be included as a processor "core" in a highly-integrated "system-on-a-chip" (SOC) for use in multimedia applications, network routers, video mobile phones, intelligent automobiles, digital television, voice recognition, 3D games, etc.

What we claim is:

1. A method of encoding instructions for a processor having two or more external instruction formats and one or more internal instruction formats, the method comprising:
   (a) selecting initial encoding parameters including a number of effective opcode bits in each external and internal format and a set of mapping functions, each of said mapping functions serving to translate an opcode specified by said opcode bits in one of the external formats to an opcode specified by said opcode bits in at least one of the internal formats;
   (b) successively selecting first operations, and allocating to each first operation executable by the processor an opcode distinct from that allocated to each other operation in each external and internal format in which the first operation is specifiable, the allocated opcodes being such that each relevant mapping function translates an external-format opcode allocated to the first operation into such an internal-format opcode allocated to the first operation and such that all the internal-format opcodes allocated to the operation have the same effective opcode bits as their related external-format opcodes; and (c) if in the allocation (b) no opcode is available for allocation in each specifiable format for every one of said first operations, determining which of said encoding parameters is constraining the allocation (b), relaxing the constraining parameter, and then repeating the allocation (b) until all of the instructions are encoded.

2. A method as claimed in claim 1, wherein each of said mapping functions involves selecting all bits of the external-format opcode as some or all of the bits of the internal-format opcode.

3. A method as claimed in claim 1, wherein in the selection (a), for each external and internal format, said number of effective opcode bits is equal to a minimum possible number of opcode bits needed to encode the number of operations specifiable in the external format concerned.

4. A method as claimed in claim 1, wherein the allocation (b) comprises a series of iterations, and prior to commencing the series of iterations a set of available opcodes in each external and internal format is formed, and in each iteration of the series one said operations is considered and the allocation of the opcode to the considered operation is made based on an examination of the sets of available opcodes in each external and internal format in which the considered operation is specifiable.

5. A method as claimed in claim 4, wherein, for each of said external and internal formats, the set of available opcodes formed prior to commencing a series of iterations has a number of members dependent upon said number of effective opcode bits currently applicable to that format.

6. A method as claimed in claim 4, wherein the available opcodes in all of the sets have the same working number of bits.

7. A method as claimed in claim 6, wherein said working number is set equal to a minimum possible number of opcode bits needed to encode a number of operations specifiable in the external or internal format having a highest number of operations specifiable in the format concerned.

8. A method as claimed in claim 4, wherein each of said iterations of the allocation (b) comprises:
(b-1) determining which, if any, available opcodes are common to sets for all the external and internal formats in which the considered operation is specifiable; and
(b-2) if the determination in (b-1) is that one or more such available opcodes are common, selecting at least one of the common opcodes, allocating it to the considered operation, and removing the selected opcode from the set for each external and internal format in which the considered operation is specifiable.

9. A method as claimed in claim 8 wherein each of said iterations of the allocation (b) further comprises:
(b-3) if the determination in (b-1) is that no common available opcode is present in the sets for all the external and internal formats in which the considered operation is specifiable, making all existing allocated opcodes void and carrying out the determination and relaxation (c).

10. A method as claimed in claim 1, further comprising:
(d) after all of the operations have allocated one of said available opcodes having said working number of bits, determining for each external format whether that working number is greater than a minimum number of bits needed to provide each operation specifiable in that external format with its own distinct opcode and, if so, restricting the allocated opcodes in that external format to the determined minimum number of bits.

11. A method as claimed in claim 10, wherein the operations in (d) comprise:
(d-1) identifying for each external format a maximum-length common prefix, if any, for all allocated opcodes in the external format concerned; and
(d-2) removing the identified common prefix from all of the allocated opcodes in the external format concerned; and
(d-3) adjusting each mapping function that serves to translate an opcode specified by the opcode bits in the external format concerned into an opcode specified by internal-format opcode bits so that the mapping function prepends the identified common prefix to the external-format opcode bits during translation.

12. A method as claimed in claim 1, wherein if the determination in (c) is that the number of effective opcode bits in one of the external or internal formats is the constraining parameter, the number of effective opcode bits in that format is increased.

13. A method as claimed in claim 1, carried out by an electronic data processing device.

14. A computer-readable storage medium storing a program which, when executed, encodes instructions for a processor having two or more external instruction formats and one or more internal instruction formats, said program comprising:
(a) a selecting code portion which selects initial encoding parameters including a number of effective opcode bits in each external and internal format and a set of mapping functions, each of said mapping functions serving to translate an opcode specified by said opcode bits in one of the external formats to an opcode specified by said opcode bits in at least one of the internal formats;
(b) an allocating code portion which allocates each first operation executable by the processor an opcode distinct from that allocated to each other first operation in each external and internal format in which the first operation is specifiable, the allocated opcodes being such that each relevant mapping function translates such an external-format opcode allocated to the first operation into such an internal-format opcode allocated to the first operation and such that all the internal-format opcodes allocated to the first operation have the same effective opcode bits as their related external-format opcodes; and
(c) a determining code portion which, if no opcode is available to the allocating code portion for allocation in each specifiable format for every one of said first operations, determines which of said encoding parameters is constraining the allocation in step (b), and relaxes the constraining parameter, and then causes the allocating code portion to repeat the allocation of opcodes until all of the instructions are encoded.

* * * * *